United States Patent [19]

Uragami

[11] Patent Number: 5,006,255
[45] Date of Patent: Apr. 9, 1991

[54] SELECTIVE PARMEABLE MEMBRANE FOR SEPARATION OF LIQUID SOLUTION

[75] Inventor: Tadashi Uragami, Osaka, Japan

[73] Assignee: Lignyte Co., Ltd., Osaka, Japan

[21] Appl. No.: 255,304

[22] Filed: Oct. 11, 1988

[30] Foreign Application Priority Data

Oct. 15, 1987 [JP] Japan .................. 62-260067

[51] Int. Cl.⁵ .................. B01D 61/36
[52] U.S. Cl. .................. 210/640; 210/500.28
[58] Field of Search ............ 525/58; 210/500.27, 210/640, 638, 500.28, 500.29; 536/20; 264/165

[56] References Cited

U.S. PATENT DOCUMENTS

| | | | |
|---|---|---|---|
| 2,788,316 | 4/1957 | Bjorksten | 202/234 |
| 2,953,502 | 9/1960 | Binning et al. | 202/42 |
| 3,415,719 | 12/1968 | Telkes | 202/83 |
| 3,455,792 | 7/1969 | Ohta | 203/40 |
| 3,562,116 | 2/1971 | Rodgers | 202/200 |
| 3,962,158 | 6/1976 | Mima et al. | 260/17.4 |
| 4,111,810 | 9/1978 | Arai et al. | 210/500.27 X |
| 4,125,708 | 11/1978 | Masri et al. | 536/20 |
| 4,406,096 | 10/1968 | Rodgers | 202/172 |
| 4,659,590 | 4/1987 | Neidlinger et al. | 427/244 |
| 4,708,947 | 11/1987 | Maruyama et al. | 525/58 X |
| 4,719,016 | 1/1988 | Storkebaum et al. | 210/640 |
| 4,808,313 | 2/1989 | Michizuki et al. | 210/500.28 |
| 4,814,132 | 3/1989 | Auki et al. | 264/165 |

Primary Examiner—Frank Spear
Attorney, Agent, or Firm—Armstrong, Nikaido, Marmelstein, Kubovcik & Murray

[57] ABSTRACT

A novel selective permeable membrane is made by cross-linking of chitosan by aldehyde, preferably by dialdehyde. The dialdehyde cross-linked membrane has a remarkably high separation efficiency for water-alcohol solution due to hydrophilic property of chitosan and its very dense structure obtained by the cross-linking of chitosan with dialdehyde.

6 Claims, 1 Drawing Sheet

SELECTIVE PARMEABLE MEMBRANE FOR SEPARATION OF LIQUID SOLUTION

BACKGROUND OF THE INVENTION

1. Field of the Invention

The present invention is directed to a selective permeable membrane for separation of a liquid solution, and more particularly to such a membrane adapted in use to selectively separate a particular volatile component from its liquid solution containing another volatile component, for example, to separate the water from a water-alcohol mixture solution.

2. Description of the Prior Art

In order to separate a liquid solution such as a water-alcohol solution, it has been proposed to use a selective permeable membrane particularly suitable to a pervaporation method in which the membrane is in contact with the liquid solution for separation of the liquid solution. Included in the membrane for separation of water-methanol mixture is a cellophane membrane as proposed in the article "Japanese Polymer Science Symposium, No. 41, 145" in 1973, and a graft polyvinyl alcohol membrane as proposed in the article "Japanese Polymer Science Vol. 26, 3223" in 1981. Further, Japanese Patent Publication (KOKAI) No. 62-4407 discloses a chitosan-vinyl monomer membrane for separation of water-ethanol mixture, and Japanese Patent Publication (KOKAI) No. 62-7403 discloses a chitosan salt membrane for separation of water-alcohol mixture.

Unfortunately, these membranes have been found to be insufficient in its separation efficiency and failed to come into industry practice. The separation efficiency of the membrane can be evaluated in terms of a separation factor $\alpha$, which indicates that the membrane allows a particular component of the liquid solution to selectively permeate therethrough when $\alpha$ being greater than 1 and indicates a greater separation efficiency with increasing value of $\alpha$, as discussed hereinafter. The above membranes without chitosan show a separation factor only in the order of several tens and even the membranes including chitosan cannot have the separation factor increased to a sufficient level for commercial practice.

SUMMARY OF THE INVENTION

The present invention eliminates the above insufficiency in the separation of liquid solution and provides a unique permeable membrane made of a chitosan derivative having superior separation efficiency. Chitosan is a cationic polymer obtained by deacetylation of chitin and soluble in a dilute acid. Chitin is a straight chain polysaccharide forming the supporting structure of crustacea, fungi, and the like available from abundant natural resources. In accordance with the present invention, chitosan is cross-linked by aldehyde to form a selective permeable membrane for liquid separation which has an increased separation efficiency not expected by the prior membrane prepared by simple deacetylation of chitosan. Such increased separation efficiency is assumed to come from an increased density of the membrane achieved by the cross-linking. In addition, due to the hydrophilic property of chitosan, the dialdehyde cross-linked chitosan membrane shows superior separation efficiency particularly for water-and-organic solvent solution. Included in aldehyde is a dialdehyde which is primarily utilized in the present invention for cross-linking of chitosan by dehydration-condensation of reactive amino groups contained in the molecule of chitosan and aldehyde groups of dialdehyde, as shown in the following formula:

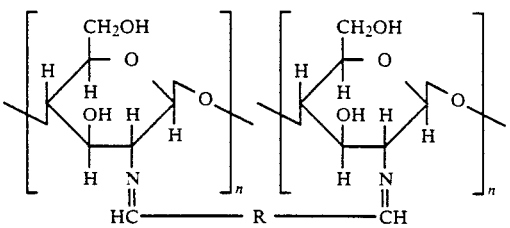

wherein n represents an integer of 200 to 20,000, and R represents a group of formula:

—$(CH_2)_m$— wherein m represents an integer of 1 or more, or

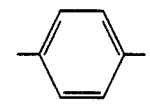

Monoaldehyde may be also utilized as an aldehyde for cross-linking of chitosan wherein monoaldehyde reacts with amino groups of chitosan to form methylol groups which are to be condensed with each other by dehydration and/or condensed with other amino groups of chitosan by dehydration to effect cross-linking of chitosan.

DETAILED DESCRIPTION OF THE INVENTION

An aldehyde cross-linked chitosan membrane in accordance with the present invention can be prepared in the following methods. In one method, chitosan is dissolved in an aqueous solution of acetic acid which solution is then spread evenly on a suitable supporting surface and dried to form a membrane. The resulting membrane is then soaked in an aqueous solution of sodium hydroxide to be neutralized followed by being washed and dried to obtain a chitosan membrane. Further, the chitosan membrane is soaked in an aqueous solution of dialdehyde including a dilute acid as a catalyst to proceed cross-linking and is then washed and dried to obtain the dialdehyde cross-linked chitosan membrane having selective permeability. The other method comprises the steps of dissolving chitosan into an aqueous solution of acetic acid, adding to this solution an aqueous solution of dialdehyde including a dilute acid as a catalyst, spreading the mixture solution on a suitable supporting surface, drying it to obtain the membrane, soaking the resulting membrane in an aqueous solution of sodium hydroxide to neutralize it, washing and drying the same to obtain the dialdehyde cross-linked chitosan membrane. When monoaldehyde is utilized to obtain an aldehyde cross-linked chitosan, the same steps may be utilized to react chitosan with monoaldehyde with the condensation of methylol groups.

Preferably, chitosan employed in the present invention has a molecular weight of 50,000 to 5,000,000 and is deacetylated up to 60-100%. Dialdehyde utilized for the above cross-linking includes glyoxal, malondialdehyde, succindialdehyde, glutardialdehyde, adipicdialdehyde, maleindialdehyde, phthaldialdehyde, iso-phthaldialdehyde, telephthaldialdehyde, and dialdehyde starch. Included in monoaldehyde are formaldehyde, acetaldehyde, propionaldehyde. The aldehyde cross-linked membrane of the present invention is preferred to have a thickness not more than 200 $\mu$.

Figure 1:
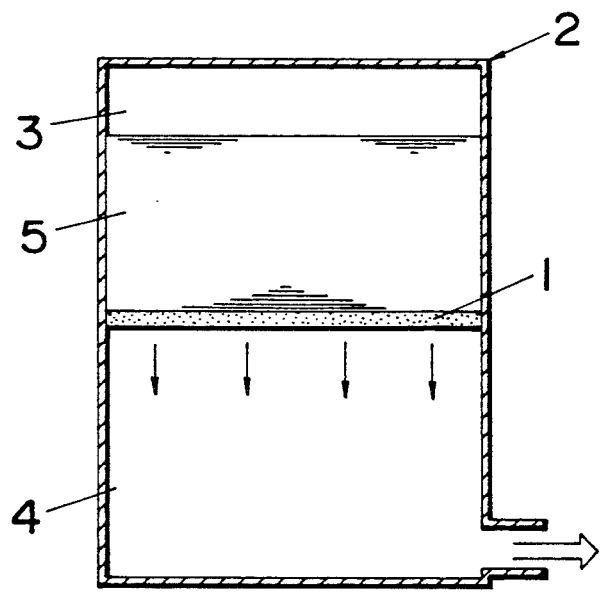
FIG. 1 is a schematic view showing a vessel in which a selective permeable membrane of the present invention is adapted in use to effect liquid separation in liquid-to-vapor phase by pervaporation method.

The aldehyde cross-linked membrane thus obtained is adapted in use for liquid separation by "pervaporation (permeation-vaporation) method". FIG. 1 illustrates the principle of the "pervaporation method" which utilizes a vessel 2 divided by the membrane 1 into an upper solution chamber 3 and an lower vacuum chamber 4. The upper solution chamber 3 is filled with a liquid solution 5 containing more than one volatile or evaporizable component such as water and alcohol in an alcohol-water solution. By evacuating the lower vacuum chamber 4, a particular component of the liquid solution 5 is allowed to preferentially permeate through the membrane 1 into the vacuum chamber 4 and is evaporated therefrom. Thus, the particular component can be collected as being separated from the liquid solution 5. In the opposite sense, the liquid solution from which the substantial amount of the particular component is removed can be recovered from the solution chamber 3. With this pervaporation method utilizing the permeable membrane 1, liquid separation can be effected successfully without causing any membrane pressurization as seen in the conventional reverse osmosis method. Further, the aldehyde cross-linked chitosan membrane exhibits preferential permeability to water due to its hydrophilic property, therefore it is found most effective for separation of water-and-organic solvent solution such as water-alcohol solution.

Figure 2:
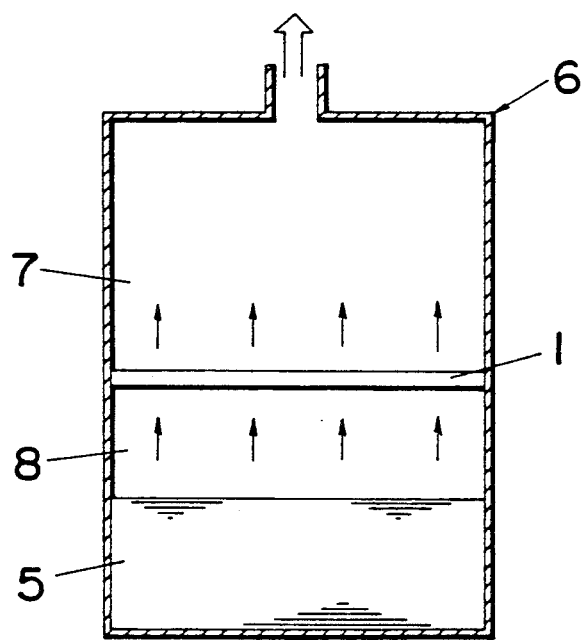
FIG. 2 is a schematic view showing a vessel in which the selective permeable membrane of the present invention is adapted in use to effect liquid separation in vapor-to-vapor phase by evapomeation method.

As an alternative liquid separation method with the use of the membrane, the inventor has proposed in the pending patent application Ser. No. 130,504 filed on Dec. 9, 1987 [US], an "evapomeation (evaporation permeation) method" which is characterized to separate a particular component from its liquid solution through the membrane in vapor-to-vapor phase. The principle of the "evapomeation method" is illustrated in FIG. 2 which utilizes a vessel 6 divided by the permeable membrane 1 into an upper vacuum chamber 7 and a lower solution chamber 8. A clearance or space is provided between the undersurface of the membrane 1 and the surface of the liquid solution 5 stored in the solution chamber 8 so as to keep the permeable membrane 1 out of direct contact with the liquid solution 5. As evacuating the vacuum chamber 7, the solution chamber 8, which is in air communication therewith through the permeable membrane 1, is correspondingly evacuated to cause the liquid solution to evaporate. When the vapor from the liquid solution thus evaporated comes into contact with the permeation membrane 1, it is allowed to permeate through the membrane 1 as it diffuses therein and is forced to enter the vacuum chamber 7 under the effect of the vacuum. Since the permeable membrane 1 allow a particular component to selectively permeate in preference to the others, it is readily possible to complete the separation either by collecting the component having passed into the vacuum chamber 7 through the permeable membrane 1 or by collecting the remaining solution in the solution chamber 8 from which the component has been removed. As seen in the above, the separation of the liquid solution 5 can be carried out in vapor-to-vapor phase permeation through the membrane 1. Consequently, the membrane 1 can be kept free from substantial swelling which is inherent where the membrane is in direct contact with the liquid solution as in the above pervaporation method, effectively preventing the permeable membrane from lowering its permeation efficiency. It is noted in this connection that the membrane of the present invention shows a remarkably superior separation efficiency for water-alcohol separation when utilized in the above "evapomeation separation method", or shows a maximum separation factor $\alpha$ of infinite value, as discussed hereinafter with reference to examples of the present invention.

When the permeable membrane of a reduced thickness is utilized, it is preferred to place the membrane on a support member for reinforcing reinforce the membrane enough to resist against a negative pressure developed therebehind. The support member may be in the form of a net or a porous substrate, for example, a porous unwoven fabric of polypropylene fibers or polyester fibers, a porous film of tetrafluoroethylene or polysulfone, or porous ceramic plate.

The present invention will be discussed with reference to the following examples, which are provided by way of illustration and not by way of limitation.

EXAMPLE 1

2.0 g of chitosan powder having an average molecular weight of 50,000 to 100,000 and being deacetylated up to 99.1% was dissolved into 200 g of an aqueous solution of 1N acetic acid and stirred overnight at 25° C. The resulting solution was filtered through a glass-filter and deaired. Subsequently, 20 of the solution was spread on a silicon finished glass plate and dried at 60° C. for 5 hours to form a membrane of chitosan-acetate. After being peeled off, the chitosan-acetate membrane was soaked in an aqueous solution of 1N sodium hydroxide overnight to be neutralized and was thoroughly washed and dried under a reduced pressure at a room temperature to obtain a 20$\mu$ thick chitosan membrane.

The chitosan membrane was soaked into a 0.4% aqueous solution of glutaraldehyde to which an aqueous solution of 0.5 N sulfuric acid was added as a catalyst and left for 15 minutes at a room temperature in order to cross-link chitosan with glutaraldehyde, which membrane was subsequently washed and dried under a reduced pressure at room temperature to give a 20$\mu$ thick dialdehyde cross-linked chitosan membrane.

The dialdehyde cross-linked membrane thus obtained was utilized as the permeable membrane dividing the vessel 2 of FIG. 1 into the upper solution chamber 3 and the lower vacuum chamber 4. Samples 1 to 8, which are aqueous solutions of different ethanol concentrations, were each introduced into the solution chamber 3 in order to preferentially permeate the water through the membrane by evacuating the vacuum chamber 4 down to a pressure of $10^{-2}$ Torr. at a solution temperature of 40° C. A separation factor $\alpha$ and a permeation rate Q were obtained for each sample for evaluation of permeation efficiency of the membranae, as listed in Table 1.

The separation factor $\alpha$ in Table-1 is introduced to indicate the weight ratio of a particular component being separated to the liquid solution from which the particular component is separated and is accordingly defined in this instance by the following equation:

$$\alpha = \frac{Y_{H2O}/Y_{ETOH}}{X_{H2O}/X_{ETOH}}$$

wherein $X_{H2O}$ and $X_{ETOH}$ are fractions of water and ethanol respectively in aqueous ethanol solution received in the solution chamber, while $Y_{H2O}$ and $Y_{ETOH}$ are fractions of water and ethanol, respectively after permeating through the membrane as measured in the subsequently liquified phase. As apparent from the above relation, when $\alpha$ is greater than 1, it means that the water has passed through the membrane in a greater amount than the ethanol and that the water is allowed to pass preferentially through the membrane to a larger extent as the value $\alpha$ becomes greater. It is noted in this connection that the permeation rate Q in Table 1 is defined as a rate at which the water and ethanol having the proportion represented by the value has permeated through the membrane per unit time and unit area.

in the order of several tens, which demonstrates that Example 1 has superior separation efficiency of preferentially separating the water from the alcohol-water solution as compared to Comparative Example 1.

EXAMPLE 2

The same dialdehyde cross-linked chitosan membrane as obtained in Example 1 was utilized as a permeable membrane to effect liquid separation for water-ethanol solution in accordance with the "evapomeation method" utilizing the vessel 6 of FIG. 2. Like samples 1 to 8, which are aqueous solutions of different ethanol concentrations, were each introduced into the solution chamber 8 in order to preferentially permeate the water through the membrane by evacuating the vacuum chamber 7 down to a pressure of $10^{-2}$ Torr. at a solution temperature of 40° C. A separation factor $\beta$ and a permeation rate Q were obtained for each sample for evaluation of permeation efficiency, as listed in Table 2.

Comparative Example 2

TABLE 1

| sample | ethanol concentration [wt %] in water-ethanol solution | Example 1 separation factor [α] | Example 1 permeation rate [kg/m² hr] | α × Q | Comparative Example 1 separation factor [α] | Comparative Example 1 permeation rate [kg/m² hr] | α × Q |
|---|---|---|---|---|---|---|---|
| 1 | 0 | 1 | 1.37 | 1.37 | 1 | 1.87 | 1.87 |
| 2 | 10 | 2 | 1.27 | 2.54 | 0.6 | 1.50 | 0.90 |
| 3 | 30 | 10 | 0.78 | 7.80 | 2 | 1.36 | 2.83 |
| 4 | 50 | 52 | 0.90 | 46.8 | 13 | 0.67 | 8.38 |
| 5 | 70 | 182 | 0.39 | 71.0 | 50 | 0.35 | 17.5 |
| 6 | 90 | 505 | 0.06 | 30.3 | 31 | 0.12 | 3.75 |
| 7 | 95.6 | 390 | 0.03 | 11.7 | 17 | 0.06 | 1.03 |
| 8 | 100 | 1 | 0.02 | 0.02 | 1 | 0.03 | 0.03 |

Comparative Example 1

The chitosan membrane before being cross-linked with glutaraldehyde in Example 1 was utilized as the membrane to carry out the separation of water-alcohol solution in the same manner as in Example 1. Like samples of different ethanol concentrations were each tested to provide the separation factor α and permeation rate Q under the same conditions as in Example 1. The test results are also listed in Table 1.

As apparent from Table 1, it is confirmed that Example 1 utilizing the dialdehyde cross-linked chitosan membrane shows the separation factor of up to several hundreds, while Comparative Example 1 utilizing the simple chitosan membrane shows the separation factor The same chitosan membrane as obtained in Example 1 before being cross-linked with glutaraldehyde was utilized to effect liquid separation in the like manner as in Example 2 to present the separation factor α and the permeation rate Q for each sample, as listed in Table 2. In Table 2, the values enclosed by braces for the column "ethanol concentration [wt %]in water-ethanol solution" represent respective conversion values for ethanol concentration [wt %]in vapor, and the like conversion values are shown as enclosed by braces for each column of "separation factor" and "α×Q".

TABLE 2

| sample | ethanol concentration [wt %] in water-ethanol solution | Example 2 separation factor [α] | Example 2 permeation rate [kg/m² hr] | α × Q | Comparative Example 2 separation factor [α] | Comparative Example 2 permeation rate [kg/m² hr] | α × Q |
|---|---|---|---|---|---|---|---|
| 1 | 0 | 1 | 0.24 | 0.24 | 1 | 0.18 | 0.18 |
| 2 | 10 (43.9) | 219 (1542) | 0.20 | 43.8 (308.4) | 5 (33) | 0.15 | 0.75 (4.95) |
| 3 | 30 (60.4) | ∞ (∞) | 0.15 | ∞ (∞) | 7 (25) | 0.13 | 0.91 (3.25) |
| 4 | 50 (67.7) | ∞ (∞) | 0.11 | ∞ (∞) | 26 (56) | 0.10 | 2.60 (5.6) |
| 5 | 70 (77.3) | ∞ (∞) | 0.06 | ∞ (∞) | 37 (53) | 0.04 | 1.48 (2.12) |
| 6 | 90 (90.8) | 2557 (2797) | 0.03 | 76.7 (83.9) | 114 (124) | 0.02 | 2.28 (2.48) |
| 7 | 95.6 | 2208 | 0.04 | 83.3 | 202 | 0.01 | 2.02 |
| 8 | 100 | 1 | 0.03 | 0.03 | 1 | 0.01 | 0.01 |

As seen from Table 2, Example 2 utilizing the dialdehyde cross-linked membrane of the present invention shows greater values both in the separation factor α and permeation rate Q with respect to every samples 1 to 8 of differing ethanol concentrations than Comparative Example 2 utilizing simple chitosan membrane. Particularly, with regard to samples 3 to 5 for water-ethanol solutions having ethanol concentrations of 30 to 70 wt%, the separation factor α is found to be ∞ indicating that 100% of the water is allowed to permeate through the membrane in preference to ethanol. Accordingly, the dialdehyde cross-linked chitosan membrane is confirmed to have a remarkably high separation efficiency specifically for ethanol-water solution having such ethanol concentrations. From the comparison between the results of Table 1 and Table 2, it is also concluded that the dialdehyde cross-linked membrane exhibits a superior separation efficiency when utilized in the "evapomeation method" than in the "pervaporation method".

What is claimed is:

1. A process of selectively separating water from a liquid solution containing water and an organic solvent, which comprises contacting the solution with a permeable membrane made of chitosan cross-linked with a dialdehyde and having the following general formula:

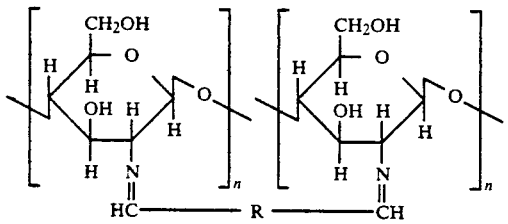

wherein n represents an integer of 200 to 20,000, and R represents a group of formula:

—(CH$_2$)$_m$—wherein m represents an integer of 1 or more, or

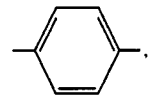

whereby water selectively vaporizes and permeates the membrane.

2. A process according to claim 1, wherein the chitosan has a molecular weight of between 50,000 to 5,000,000 and is 60 to 100% deacetylated.

3. A process according to claim 1, wherein the dialdehyde is a glyoxal, malondialdehyde, succindialdehyde, glutardialdehyde, adipicdialdehyde, maleindialdehyde, phthaldialdehyde, isophthaldialdehyde, telephthaldialdehyde or dialdehyde starch.

4. A process of selectively separating water from an aqueous solution containing ethyl alcohol, which comprises contacting the solution with a membrane made of chitosan cross-linked with a dialdehyde and having the following general formula:

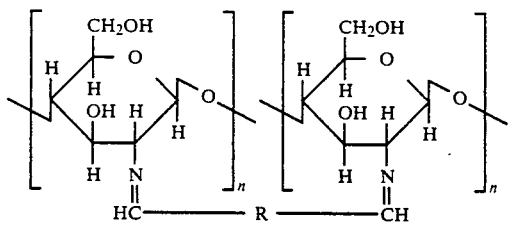

wherein n represents an integer of 200 to 20,000, and R represents a group of formula:

—(CH$_2$)$_m$—wherein m represents an integer of 1 or more, or whereby water selectively vaporizes and permeates the membrane.

5. A process according to claim 4, wherein the chitosan has a molecular weight of between 50,000 to 5,000,000 and is 60 to 100% deacetylated.

6. A process according to claim 4, wherein the dialdehyde is a glyoxal, malondialdehyde, succindialdehyde, glutardialdehyde, adipicdialdehyde, maleindialdehyde, phthaldialdehyde, isophthaldialdehyde, telephthaldialdehyde or dialdehyde starch.

* * * * *